(12) United States Patent
Hiranaka

(10) Patent No.: US 7,561,518 B2
(45) Date of Patent: Jul. 14, 2009

(54) DATA SENDING/RECEIVING SYSTEM AND METHOD, INFORMATION PROVIDING APPARATUS AND METHOD, AND DATA RECEIVING APPARATUS AND METHOD

(75) Inventor: Daisuke Hiranaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 875 days.

(21) Appl. No.: 10/610,834

(22) Filed: Jul. 1, 2003

(65) Prior Publication Data

US 2004/0010595 A1    Jan. 15, 2004

(30) Foreign Application Priority Data

Jul. 3, 2002    (JP)    ............ P2002-195017

(51) Int. Cl.
*H04L 12/56*    (2006.01)
(52) U.S. Cl. .................... 370/235; 370/389
(58) Field of Classification Search ............. 709/231, 709/235
See application file for complete search history.

(56) References Cited

U.S. PATENT DOCUMENTS

| | | | | |
|---|---|---|---|---|
| 5,557,798 | A | 9/1996 | Skeen et al. ............ | 705/35 |
| 5,572,678 | A * | 11/1996 | Homma et al. .......... | 370/410 |
| 6,263,371 | B1 * | 7/2001 | Geagan et al. .......... | 709/231 |
| 2001/0053222 | A1 * | 12/2001 | Wakao et al. ........... | 380/43 |
| 2003/0014705 | A1 * | 1/2003 | Suzuki et al. .......... | 714/748 |
| 2003/0206549 | A1 * | 11/2003 | Mody et al. ........... | 370/390 |

FOREIGN PATENT DOCUMENTS

| | | |
|---|---|---|
| EP | 1 225 735 | 7/2002 |
| EP | 1225735 A1 * | 7/2002 |
| FR | 2 797 543 | 2/2001 |
| JP | 2002 157175 | 5/2002 |
| WO | WO 01 67664 | 9/2001 |
| WO | WO 02 05496 | 1/2002 |

OTHER PUBLICATIONS

Patent Abstract of Japan, 2000 151680, publication date May 30, 2000; vol. 2000, No. 08, Oct. 6, 2000.

* cited by examiner

*Primary Examiner*—Anh-Vu Huynh Ly
(74) *Attorney, Agent, or Firm*—Frommer Lawrence & Haug LLP; William S. Frommer; Thomas F. Presson

(57) ABSTRACT

A data sending/receiving system having an information providing apparatus including a content data storage unit to store content data, and a streaming data generator to generate streaming transmission data from content data. The system also includes a streaming interface, a download file generator to generate a download file of content data and a download interface for the download file, which is connected to a data receiving terminal including a storage control circuit to control storage of content data into a content data recording unit. The system also include a packet information recording unit to record data packet ID information and a packet resend requesting circuit to request for resending a missing packet, via a network. Defect-free data can be transmitted with the real-time signal transmission being assured even when data is received, for recording, via a low-reliability network.

12 Claims, 3 Drawing Sheets

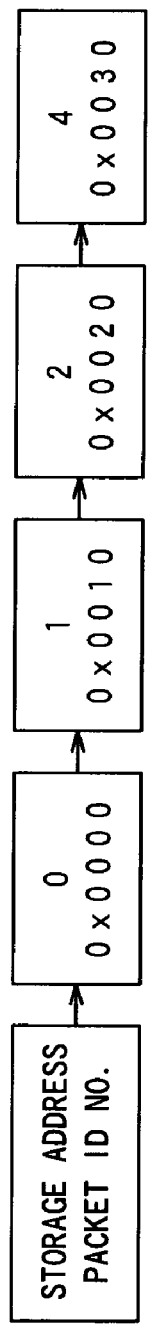
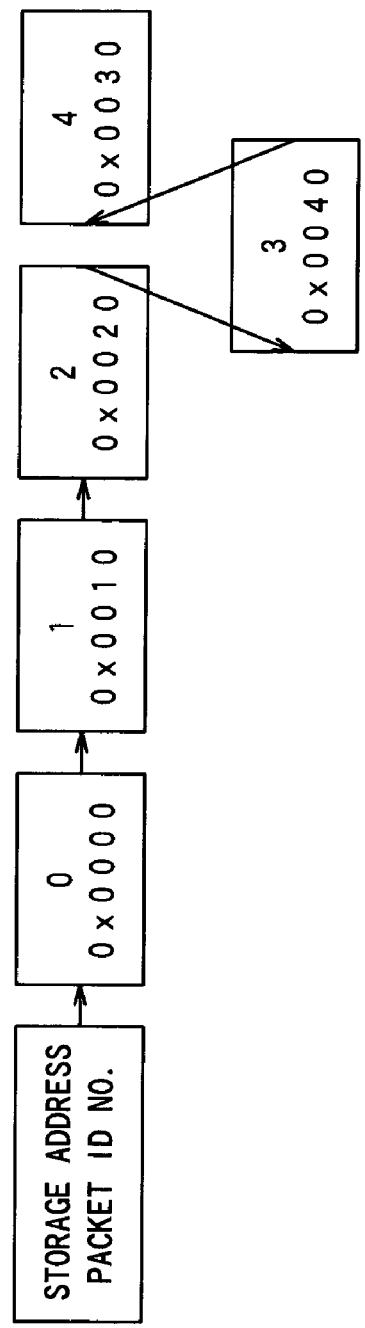
FIG.2A
FIG.2B

DATA SENDING/RECEIVING SYSTEM AND METHOD, INFORMATION PROVIDING APPARATUS AND METHOD, AND DATA RECEIVING APPARATUS AND METHOD

BACKGROUND OF THE INVENTION

1. Field of the Invention

The present invention generally relates to a data sending/receiving system and method, and more particularly to a data sending/receiving system and method, capable of downloading and streaming data in an environment in which no positive data transmission can be assured. Also, the present invention is directed to an information providing apparatus and method, and a data receiving apparatus and method suitable for use in the data sending/receiving system.

This application claims the priority of the Japanese Patent Application No. 2002-195017 filed on Jul. 3, 2002, the entirety of which is incorporated by reference herein.

2. Description of the Related Art

Recently, the distribution of AV (audio and visual) contents such as image data, music data, etc. over the Internet has become popular. The modes of data distribution typically includes so-called "downloading" by which the user acquires an AV content as a file and "streaming" by which the user can view and listen to AV content data stored in a server and reproduce the data while the data is being received.

In case content data is sent and received via the Internet, especially, in case the data is downloaded (especially, for buying or selling), the data has to be free from missing (defect). On this account, a protocol which assures a positive data transmission, such as TCP (transmission control protocol), is used as far as possible for positive data sending and reception over a low-reliability transmission channel such as the Internet. TCP includes a protocol for recovering the initial sent sequence of the packets having arrived in a different sequence due to a condition of the network, and requesting for resending of packets not sent due to occurrence of any error, thereby implementing a positive data transmission.

On the other hand, the content data distribution via a network, such as audio on demand (AOD), video on demand (VOD) or the like, uses the "streaming" technique for the purpose of natural sound or image reproduction since the streaming assures a real-time data transmission.

TCP, if applied in a data transfer which has to be done on the real-time basis, will cause the data transfer to be less real-time because of a resending procedure etc. So, UDP (user datagram protocol) is used in the data transfer to assure that the data can be transferred on the real-time basis although it will sacrifice the positiveness of the data transfer to some extent.

However, the UDP-based data transmission enables a real-time data transfer for streaming but will not actually make it possible to receive all packets. Often in distribution of an AV content such as a music software over the Internet, the user once confirms the AV content concerning its contents by streaming and then downloads the full AV content if he or she wants to buy.

In the above case, the user acquires almost all data, that are not full, by streaming in the confirmation of the contents of the AV content, but he has to download all the data for buying them. Also, in almost all case, the user wants to reproduce (stream) the contents of the acquired AV content immediately.

Downloading the content of which the majority has been acquired by such streaming is not only a large burden to the transmission channel and server but obliges the user to make a vain payment of connection fees.

OBJECT AND SUMMARY OF THE INVENTION

It is therefore an object of the present invention to overcome the above-mentioned drawbacks of the related art by providing a data sending/receiving system and method, for making a defect-free data transmission while assuring a real-time signal transmission even when data is received and recorded via a network whose reliability is low, a data providing apparatus and method, applied in the data sending/receiving system, and an information receiving apparatus and method.

The above object can be attained by providing a data sending/receiving system comprising an information providing apparatus for sending content data and a data receiving apparatus connected to each other via a network and in which the content data is packetized for sending and reception between the information providing apparatus and data receiving apparatus, the data receiving apparatus including, according to the present invention, a missing-packet detecting means for detecting any missing packet; and a missing-packet resend requesting means for requesting to resend the missing packet; the data receiving apparatus receiving content data by a connectionless-mode transmission; and the missing-packet resend requesting means requesting, when the missing-packet detecting means detects a missing packet, the information providing apparatus to resend the missing packet by a connection-mode transmission.

The above data sending/receiving system can send/receive defect-free data while assuring a real-time signal transmission even via a low-reliability network.

More specifically, the information providing apparatus includes a storage means for storing content data, a temporary storage means for provisionally storing a series of content data to be sent, and a sending means for packetizing the series of content data and sending the data by a connection- or connectionless-mode transmission. Also, the data receiving apparatus includes a receiving means for receiving the data packets sent from the sending means, a demultiplexing means for demultiplexing the content data reconstructed from the data packets, a decoding means for decoding the demultiplexed image data and music data, a received packet information recording means for recording the received packet information in the reconstructed content data, and a recording means for recording the content data reconstructed from the data packets and the resent missing packet.

Note that the connection-mode transmission should preferably use TCP (transmission control protocol) while the connectionless-mode transmission use UDP (user datagram protocol).

Also the above object can be attained by providing a data sending/receiving method of sending/receiving content data packetized for sending/receiving, the method including, according to the present invention, the steps of detecting a missing one of the sent packets at the receiving side; requesting to resend the missing packet; the content data being received by a connectionless-mode transmission; and requesting, when a missing packet is detected in the missing-packeting detecting step, in the missing-packet resend requesting step to resend the missing packet by a connection-mode transmission.

More specifically, the data sending/receiving method includes the steps of packetizing a series of stored content data and sending the data by a connectionless-mode transmission; sending data packets of the series of content data by a connectionless-mode transmission; receiving the data packets sent in the sending step; demultiplexing the content data reconstructed from the data packets; decoding demultiplexed video data and music data; recording the received packet information in the reconstructed content data; requesting to resend a missing packet, if any detected in a missing-packet detecting step, by a connection-mode transmission; and recording the content data reconstructed from the data packets and the resent missing packet.

Note that the connection-mode transmission should preferably use TCP (transmission control protocol) while the connectionless-mode transmission use UDP (user datagram protocol).

Also the above object can be attained by providing an information providing apparatus including, according to the present invention, a storage means for storing content data; and a sending means for packetizing a series of content data and sending the data to a data receiving apparatus by a connectionless-mode transmission; a missing packet being sent to the data receiving apparatus by a connection-mode transmission when it is requested by the data receiving apparatus to resend the missing packet.

Note that the connection-mode transmission should preferably use TCP (transmission control protocol) while the connectionless-mode transmission use UDP (user datagram protocol).

Also the above object can be attained by providing an information providing method including, according to the present invention, the steps of packetizing a series of stored content data and sending the data to a data receiving apparatus by a connectionless-mode transmission; and sending, when it is requested by the data receiving apparatus to resend a missing packet, the missing packet by a connection-mode transmission.

Note that the connection-mode transmission should preferably use TCP (transmission control protocol) while the connectionless-mode transmission use UDP (user datagram protocol).

Also the above object can be attained by providing a data receiving apparatus including, according to the present invention, a receiving means for receiving packetized content data; a missing-packet detecting means for detecting any missing packet in the received content data; and a missing-packet resend requesting means for requesting to resend the missing packet; the receiving means receiving content data by a connectionless-mode transmission; and the missing-packet resend requesting means requesting an information providing apparatus, when a missing packet is detected by the missing-packet detecting means, to resend the missing packet by a connection-mode transmission.

More specifically, the data receiving apparatus includes a reproducing means for reproducing, by reconstruction, the content data from received data packets, a received packet information recording means for recording received packet information in the reconstructed content data, and a recording means for recording the reconstructed content data and the resent missing packet.

Note that the connection-mode transmission should preferably use TCP (transmission control protocol) while the connectionless-mode transmission use UDP (user datagram protocol).

Also the above object can be attained by providing a data receiving method including, according to the present invention, the steps of receiving packetized content data; detecting any missing packet in the received packetized content data; and requesting to resend the missing packet; the content data being received by a connectionless-mode transmission; and an information providing apparatus being requested to resend, when a missing packet is detected in the missing-packet detecting step, the missing packet by a connection-mode transmission.

More specifically, the data receiving method includes the steps of reproducing, by reconstruction, the content data from the received data packets; and recording the received packet information in the reconstructed content data; the reconstructed content data and resent missing packet being recorded to the recording means. Note that the connection-mode transmission should preferably use TCP (transmission control protocol) while the connectionless-mode transmission use UDP (user datagram protocol).

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 2A is a schematic illustration for explaining the missing of a data packet in a storage control circuit in a data receiving terminal of the data sending/receiving system in FIG. 1; and FIG. 2B is also a schematic illustration for explaining the complementation of the missing packet in the storage control circuit in the data receiving terminal in the data sending/receiving system in FIG. 1.

DETAILED DESCRIPTION OF THE PREFERRED EMBODIMENTS

The embodiment of the data sending/receiving system according to the present invention is such that for sending/receiving of content data in the form of packets, the content data is first sent by the connectionless-mode transmission, and any data packet which could not be sent is resent by the connection-mode transmission, thereby permitting to transmit defect-free data without having to re-downloading all the content data of which the majority has been acquired by streaming even when the data is sent/received over a network whose reliability is low. Thus, the data sending/receiving system according to the present invention is constructed for a receiving terminal to detect a missing packet in all packets of content data sent from an information providing apparatus so that each of all the packets can be identified for recording, and to request the information providing apparatus to resend the missing packet.

Figure 1:
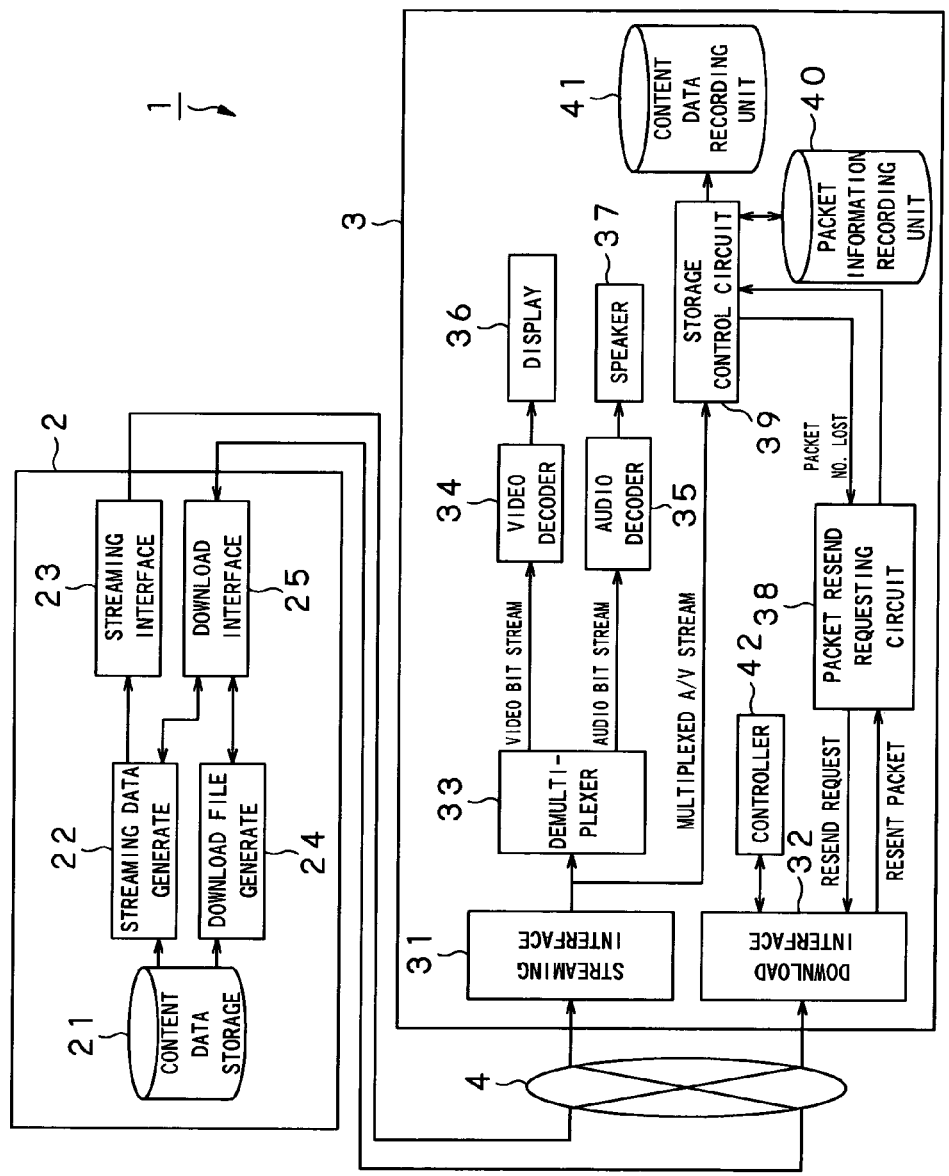
FIG. 1 is a block diagram of an embodiment of the data sending/receiving system according to the present invention.

Referring now to FIG. 1, there is illustrated in the form of a schematic block diagram an embodiment of the data sending/receiving system according to the present invention. The data sending/receiving system is generally indicated with a reference 1. As shown in FIG. 1, the data sending/receiving system 1 includes an information providing apparatus 2 and data receiving terminal 3, as the main system components connected to each other via a network 4. In the data sending/receiving system 1, the information providing apparatus 2 distributes AV (audio and visual) contents such as image data, music data, etc. via a network, and the data receiving terminal 3 receives the AV content data from the information providing apparatus 2. By "streaming" (re producing the AV content data while receiving the data) at the receiving terminal, the user of the data receiving terminal 3 can directly view and listen to the received data. It should be noted that the network 4 is a low-reliability data transmission channel such as the so-called Internet.

The above data sending/receiving system 1 is applicable for sending/receiving content data via the network, especially, for a data distribution or the like intended for selling/buying of content data.

Next, each of the system components of the data sending/receiving system 1 will be described in detail below:

The information providing apparatus 2 includes a content data storage unit 21 in which content data are stored, a streaming data generator 22 for generating transmission data for sending content data as a stream, and a streaming interface 23 for the streaming data. It further includes a download file generator 24 for generating a file for downloading the content data, and a download interface 25 for the file.

The content data storage unit 21 in the information providing apparatus 2 stores the content data produced by multiplexing image data and music data and further packetizing the multiplexed data. Depending upon the data format, content not packetized and multiplexing and packetizing information may be separately managed.

A data packet has added to the header thereof a packet ID number unique to each content. Also, each of all contents stored in the content data storage unit 21 has been added thereto an ID number unique thereto. Thus, the streaming data generator 22 and download file generator 24 can extract a part of contents from the storage block content data storage unit 21 in the unit of a packet when a content ID number and packet ID number are designated.

The data receiving terminal 3 includes a streaming interface 31 for receiving mainly streaming data, and a download interface 32 for receiving mainly downloading file.

The streaming interface 31 supports a real-time connectionless-mode transmission such as audio on demand (AOD), video on demand (VOD) or the like in the content data distribution, and adopts UDP (user datagram protocol) (UDP/IP (Internet protocol)). On the other hand, the download interface 32 supports a connection-mode transmission, and adopts a protocol which assures a positive data transmission such as TCP (transmission control protocol) (TCP/IP (Internet protocol)).

The data receiving terminal 3 further includes a demultiplexing circuit 33 which demultiplexes the image data and music data multiplexed in the received content data, a video decoder 34 which decodes a video bit stream demultiplexed in the demultiplexing circuit 33, and an audio decoder 35 which decodes an audio bit stream demultiplexed in the demultiplexing circuit 33. The demultiplexing circuit 33 sends the content data except for the packet header to each of the decoders 34 and 35. Since the audio and image data arrive at separate UDP ports, respectively, so the data packets can be identified from each other. The image data decoded by the video decoder 34 is displayed on a display 36. Also, the music or audio data decoded by the audio decoder 35 is delivered at a speaker 37.

Further, the data receiving terminal 3 includes a storage control circuit 39 which controls the storage of input content data into a content data recording unit 41, a packet information recording unit 40 which records the data packet information, and a packet resend requesting circuit 38 which requests to resend a missing packet. The data receiving terminal 3 also includes a controller 42 to control the entire system.

The controller 42 in the data receiving terminal 3 designates a content ID number and sends a streaming send request to the streaming data generator 22 via the TCP-based download interface 32. The streaming data generator 22 streams packetized content data on the basis of UDP/IP.

Data packet arriving at the data receiving terminal 3 is sent to the demultiplexing circuit 33 while being sent to the storage control circuit 39.

The storage control circuit 39 controls the storage, into the content data recording unit 41, of the multiplexed content data composed of a series of data packets supplied from the streaming interface 31. Also, the storage control circuit 39 records data packet information obtained from the packet header to the packet information recording unit 40 while detecting a missing data packet. Further, the storage control circuit 39 sends a content ID number and a packet ID number for the missing data packet to the packet resend requesting circuit 38.

The packet resend requesting circuit 38 designates the content ID number and packet ID number of the missing data packet and sends a resend request to the information providing apparatus 2. The information providing apparatus 2 will resend a data packet corresponding to the missing data packet to the data receiving terminal 3 by TCP-based transmission.

Note that the storage control circuit 39 can store, into the packet information recording unit 40, data packet storage addresses in the content data recording unit 41 as a table associated with packet information of the content data. Since the packet header has data size, packet ID number, etc. prerecorded therein, the storage control circuit 39 can recognize attribute information on the data packet by reading the packet header of each of the data packets sequentially received. With information for identification of a packet, such as an ID number, time stamp, etc. of the data packet, being separately recorded in the packet information recording unit 40, a packet missed at occurrence of a packet error, packet loss or the like can be acquired by a highly reliable data transfer method such as TCP on the basis of the information at a timing different from that of the streaming.

Thus, the storage control circuit 39 can record the content data into the content data recording unit 41, with a recording area being remained for a missing packet, on the basis of the data packet information and content data storage addresses once recorded in the packet information recording unit 40. In this case, a missing data packet received from the information providing apparatus 2 can be recorded to a position where the corresponding data is normally to be recorded.

Also, in case the content data recording unit 41 is a random-accessible disk-shaped recording medium, the resent missing data packet may additionally be recorded to the content data recording unit 41. In this case, the missing data packet resent and additionally recorded (packet ID number "0x0040") can be inserted into the content data having arrived first in an order as shown in FIG. 2A to recover the initial order of the data packets, as shown in FIG. 2B, before the content data is reproduced. Also, in case the content data recording unit 41 is a linear recording medium, a temporary storage unit may be provided to provisionally store received content data so that after a missing packet is received, the provisionally stored content data can be refilled with the received missing packet into a due position to recover the initial order of the data packets and then the full content data thus restored be recorded to the linear recording medium.

The storage control circuit 39 combines the content data received by streaming and the resent data packet received by TCP-based transmission and records, referring to the packet information recording unit 40, the resultant data as the full content data to the content data recording unit 41.

Note that the data receiving terminal 3 may be a personal computer, mobile phone, PDA (personal digital assistants) or the like provided that it is connectable to the Internet and can reproduce AV contents. Also, distributed content data may be music data, image data, text data, program data, etc. Further, UDP may be used for requesting from the data receiving terminal 3 to the information providing apparatus 2 to stream data, or resend a missing data packet by designating a content ID number and packet ID number.

Next, how the data sending/receiving system 1 requests to resend a data packet will be described with reference to FIG. 3.

First in step S1, the data receiving terminal 3 in the data sending/receiving system 1 designates a content ID number and sends a streaming send request to the streaming data generator 22 in the information providing apparatus 2 via the TCP-based download interface 32 (or UDP-based streaming interface 31). Then the information providing apparatus 2 will stream content data packetized in the streaming data generator 22 on the basis of UDP/IP. The data packets arriving at the data receiving terminal 3 are demultiplexed by the demultiplexing circuit 33 into video data (image data) and audio data (music data), which will be real-time reproduced.

The data packets arriving at the data receiving terminal 3 are sent to the storage control circuit 39 and recorded to the content data recording unit 41 (in step S2). At this time, the content ID number and packet ID number of the content data are recorded in association with a storage address to the packet information recording unit 40 (in step S3).

In step S4, the storage control circuit 39 confirms that the streaming is over, and then goes to step S5 where it will detect any missing data packet by counting packet ID numbers of the data packets arriving at the storage control circuit 39.

Next in step S6, the storage control circuit 39 judges whether there is any missing data packet. When a missing data packet is found, the storage control circuit 39 goes to step S7 where it will send the packet ID number and content ID number of the missing data packet to the packet resend requesting circuit 38. The packet resend requesting circuit 38 designates the content ID number and packet ID number of the missing data packet and sends a missing-packet resend request to the information providing apparatus 2. Then, the information providing apparatus 2 will resend the designed data packet by TCP-based transmission.

On the other hand, if no missing data packet is detected, the system exits the process taking that the downloading is simultaneously over.

Figure 3:
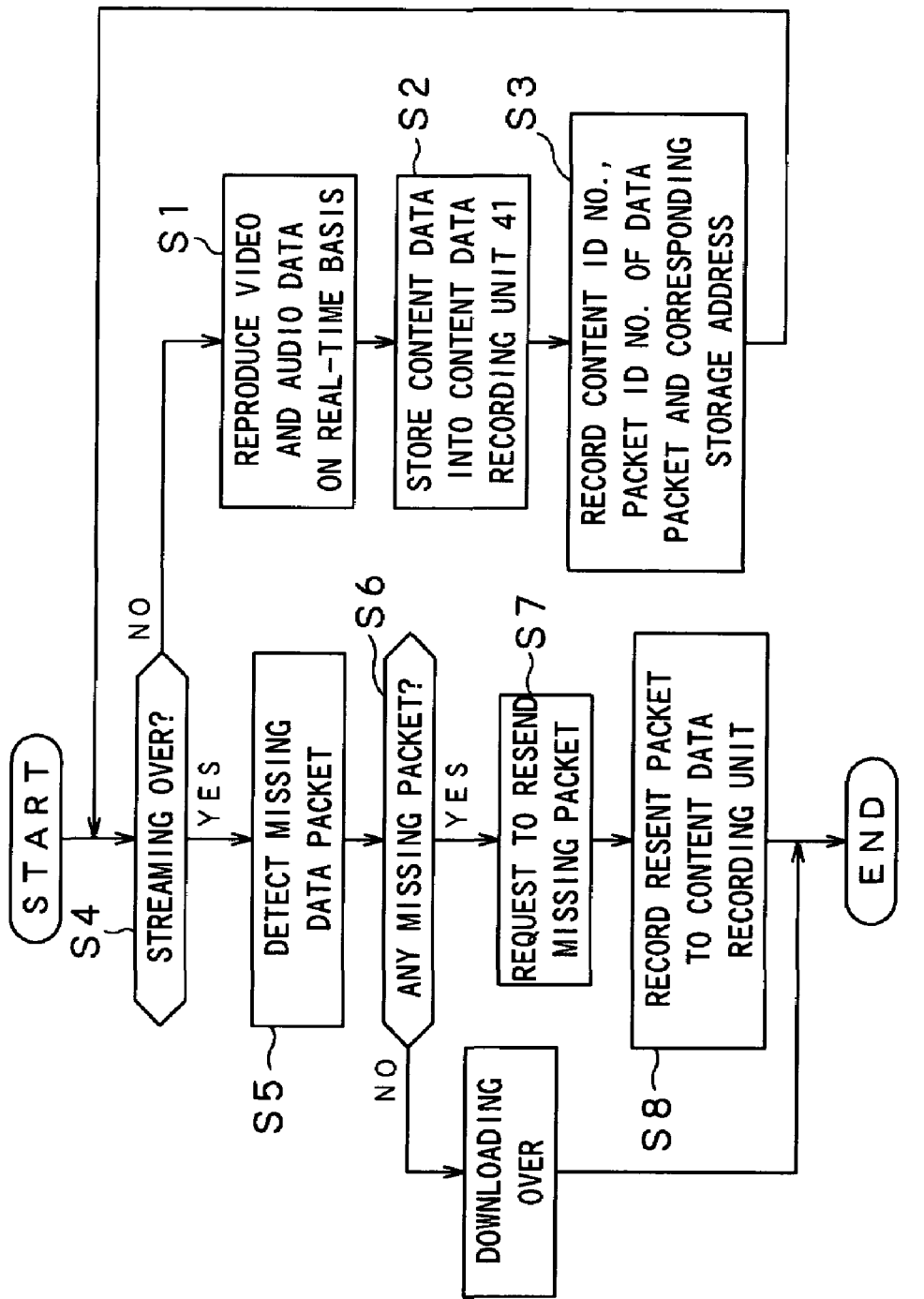
FIG. 3 shows a flow of operations made in the missing packet detection and missing-packet resending in the data sending/receiving system in FIG. 1.

Next, when the storage control circuit 39 receives the resent data packet by TCP-based transmission in step S8, it refers to the packet information recording unit 40 and records the resent missing data packet to the content data recording unit 41 as shown in FIG. 3.

The resending timing can be changed correspondingly to the operating condition of the network 4 and information providing apparatus unit! 2. For example, it may be requested to sequentially resend packets missed in streaming of content data or to resend missing packets after streaming a series of content data.

As having been described in the foregoing, by designating only data packets missed in streaming and downloading them, downloading of the content data is complete upon completion of the streaming or in a wait time corresponding to a packet loss ratio. Therefore, the time taken for network connection for re-reception of a file data for downloading can be reduced and also connection to the network is possible with less fees. Also, the burden to the information providing apparatus 2 and data receiving terminal 3 can be reduced.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

For example, the streaming interface 31 and download interface 32 are provided separately, but they may not be provided separately since TCP/IP and UDP/IP are protocols and these interfaces have only to be an interface supporting both these protocols.

As having been described in detail in the foregoing, in the data sending/receiving system according to the present invention, including the missing-packet detecting means and missing-packet resend requesting means, content data is received by a connectionless-mode transmission, and if the missing-packet detecting means detects a missing packet in the received content data packets, the missing-packet resend requesting means sends a missing-packet resend request to the information providing apparatus, and thus the information providing apparatus resends the missing packet by a connection-mode transmission. So, even when content data is received, for recording, via a low-reliability network, defect-free data can be acquired with the real-time signal transmission being maintained and without resending a full file of the content data. Therefore, the time for connection to the network can be reduced, and thus connection to the network is possible with less fees. Further, the burden of content data sending/reception to the information providing apparatus and data receiving terminal can be reduced.

Also, in the data sending/receiving method according to the present invention, content data is received by the connectionless-mode transmission, and if a missing packet is detected, it is resent by the connection-mode transmission. So, even when the content data is received, for recording, via a low-reliability network, defect-free data can be acquired with the real-time signal transmission being maintained and without resending a full file of the content data. Therefore, the time for connection to the network can be reduced, and thus connection to the network can be done with a reduced fee. Further, the burden of content data sending/reception to the information providing apparatus and data receiving terminal can be reduced.

Also in the information providing apparatus and data receiving method according to the present invention, stored content data are packetized and sent to the data receiving apparatus by the connectionless-mode transmission, and when the data receiving apparatus requests to resend a missing packet, the latter is sent by the connection-mode transmission. So, even when data is sent via a low-reliability network, defect-free data can be distributed with the real-time signal transmission being maintained and without having to resend a full file of the content data. Therefore, the time for connection to the network can be reduced, and thus connection to the network can be done with a reduced fee. Further, the burden of content data sending/reception can be reduced.

Also in the data receiving apparatus and method according to the present invention, search is made for a missing packet when packetized content data is received by the connectionless-mode transmission, a request for resending of the missing packet is made and the missing packet is received by the connection-mode transmission. So, even when the content data is received, for recording, via a low-reliability network, defect-free data can be acquired with the real-time signal transmission being maintained and without having to re-receive a full file of the content data. Therefore, the time for connection to the network can be reduced, and thus connection to the network is possible with a reduced fee. Further, the burden of content data sending/reception can be reduced.

What is claimed is:

1. A system for sending and receiving data comprising an information providing apparatus for sending content data and a data receiving apparatus connected to each other via a network and in which the content data is packetized for sending and reception between the information providing apparatus and data receiving apparatus, the data receiving apparatus including:
   a missing-packet detecting means for detecting a missing packet;
   a content data storage means for storing content data;
   a storage control means for designating a storage area corresponding to the missing packet based on data packet information obtained from packet headers and stored addresses associated with the content data stored at the content data storage means; and
   a missing-packet resend requesting means for requesting to resend the missing packet by a connection-oriented mode transmission;
   wherein the data receiving apparatus first receives the content data by a connectionless-mode transmission and second receives the missing packet by the connection-oriented mode after completion of the transmission of the content data by the connectionless-mode; and
   wherein, when the reception of the content data by the connectionless-mode transmission is completed and the missing-packet detecting means detects a missing packet, the missing-packet resend requesting means requests the information providing apparatus to resend the missing packet by the connection-oriented mode transmission, the resent missing packet stored at the designated storage area such that the designated storage area corresponds to an allocated storage location within the content data storage means where the missing packet would have been stored if the missing packet was not missing.

2. The system as set forth in claim 1, wherein the information providing apparatus includes:
   a storage means for storing content data;
   a temporary storage means for provisionally storing a series of content data to be sent; and
   a sending means for packetizing the series of content data and sending the data by a connection-oriented mode or connectionless-mode transmission;
   and wherein the data receiving apparatus further including:
   a receiving means for receiving the data packets sent from the sending means;
   a demultiplexing means for demultiplexing the content data reconstructed from the data packets;
   a decoding means for decoding demultiplexed image data and music data;
   a received packet information recording means for recording received packet information in the reconstructed content data; and
   a recording means for recording the content data reconstructed from the data packets and a resent missing packet.

3. The system as set forth in claim 1, wherein the connection-oriented mode transmission uses TCP (transmission control protocol) while the connectionless-mode transmission uses UDP (user datagram protocol).

4. A method for sending and receiving content data packetized for the purpose of the sending and receiving, the method comprising the steps of:
   detecting a missing packet of the sent packets at a receiving side,
   designating a storage area corresponding to the missing packet based on data packet information obtained from packet headers and stored addresses associated with the content data; and
   requesting to resend the missing packet by a connection-oriented mode transmission;
   wherein the content data are received first by a connectionless-mode transmission and second the missing packet is received by the connection-oriented mode after completion of the transmission of the content data by the connectionless-mode; and
   wherein, when reception of the content data by the connectionless-mode transmission is completed and a missing-packet is detected in the missing-packet detecting step, the requesting step requests resending the missing packet by a connection-oriented mode transmission, the resent missing packet corresponds to an allocated storage location, where the missing packet would have been stored if the missing packet was not missing;
   wherein, the detecting, designating, and requesting steps are performed by a data receiving apparatus.

5. The method as set forth in claim 4, further comprising the steps of:
   packetizing a series of stored content data and sending the data by a connectionless-mode transmission;
   sending data packets of the series of content data by a connectionless-mode transmission;
   receiving the data packets sent in the sending step;
   demultiplexing the content data reconstructed from the data packets;
   decoding the demultiplexed video data and music data;
   recording received packet information in the reconstructed content data;
   requesting to resend a missing packet, if any detected in a missing-packet detecting step, by a connection-oriented mode transmission; and
   recording the content data reconstructed from the data packets and the resent missing packet.

6. The method as set forth in claim 5, wherein the connection-oriented mode transmission uses TCP (transmission control protocol) while the connectionless-mode transmission uses UDP (user datagram protocol).

7. A data receiving apparatus comprising:
   a receiving means for receiving packetized content data;
   a missing-packet detecting means for detecting a missing packet in the received content data,
   a content data storage means for storing content data;
   a storage control means for designating a storage area corresponding to the missing packet based on data packet information obtained from packet headers and stored addresses associated with the content data stored at the content data storage means; and
   a missing-packet resend requesting means for requesting to resend the missing packet by a connection-oriented mode transmission;
   wherein the receiving means first receives the content data by a connectionless-mode transmission and second receives the missing packet by the connection-oriented mode after completion of the transmission of the content data by the connectionless-mode; and
   wherein, when the reception of the content data by the connectionless-mode transmission is completed and the missing-packet detecting means detects a missing packet, the missing-packet resend requesting means requests an information providing apparatus to resend the missing packet by the connection-oriented mode transmission, the resent missing packet stored at the designated storage area such that the designated storage area corresponds to an allocated storage location within the content data storage means where the missing packet would have been stored if the missing packet was not missing.

8. The data receiving apparatus as set forth in claim 7, further comprising:
   a reproducing means for reproducing, by reconstruction, the content data from received data packets;
   a received packet information recording means for recording received packet information in the reconstructed content data; and
   a recording means for recording the reconstructed content data and a resent missing packet.

9. The data receiving apparatus as set forth in claim 7, wherein the connection-oriented mode transmission uses TCP (transmission control protocol) while the connectionless-mode transmission uses UDP (user datagram protocol).

10. A data receiving method comprising the steps of:
    receiving packetized content data;
    detecting a missing packet in the received packetized content data,
    designating a storage area corresponding to the missing packet based on data packet information obtained from packet headers and stored addresses associated with the content data; and
    requesting to resend the missing packet by a connection-oriented mode transmission;
    wherein the content data are received first by a connectionless-mode transmission and second the missing packet is received by the connection-oriented mode after completion of the transmission of the content data by the connectionless-mode; and
    requesting an information providing apparatus to resend the missing packet by the connection-oriented mode transmission when a missing packet is detected in the missing-packet detecting step, the resent missing packet corresponds to an allocated storage location, where the missing packet would have been stored if the missing packet was not missing;
    wherein, the receiving, detecting, designating, and requesting steps are performed by a data receiving apparatus.

11. The data receiving method as set forth in claim 10, further comprising the steps of:
    reproducing, by reconstruction, the content data from the received data packets; and
    recording received packet information in the reconstructed content data;
    recording the reconstructed content data and resent missing packet by the recording means.

12. The data receiving method as set forth in claim 10, wherein the connection-oriented mode transmission uses TCP (transmission control protocol) while the connectionless-mode transmission uses UDP (user datagram protocol).

* * * * *